Figure 1:
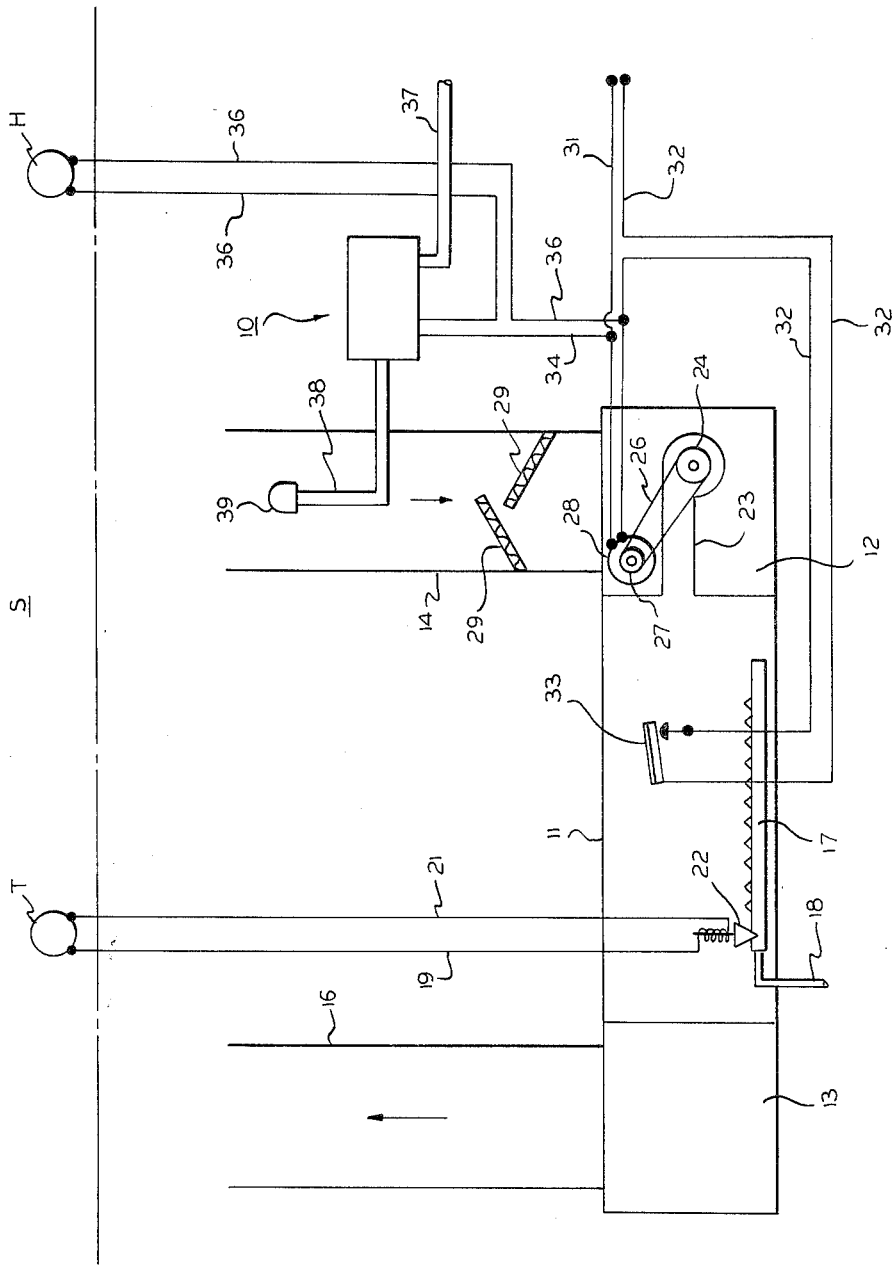

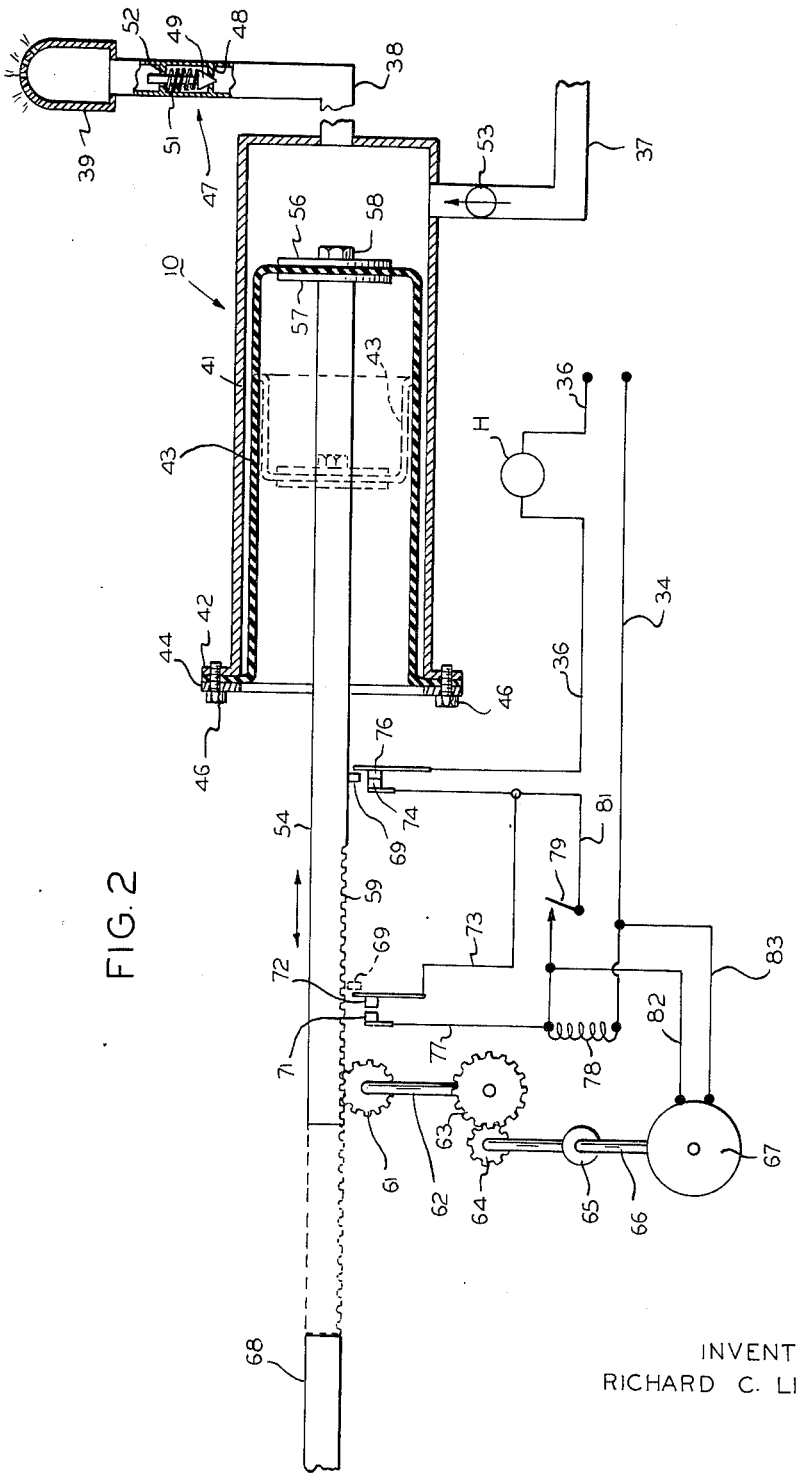

United States Patent Office 3,247,839
Patented Apr. 26, 1966

3,247,839
HUMIDIFYING APPARATUS
Richard C. Lindberg, 8348 Lincoln Ave., Skokie, Ill.
Filed Jan. 23, 1964, Ser. No. 339,678
5 Claims. (Cl. 126—113)

This invention relates to apparatus for improving the humidity within a heated space, and has particular reference to an improved apparatus for injecting a high pressure completely atomized spray into the plenum of a hot air furnace.

One of the problems attendant upon the use of warm air heating apparatus has been the reduction of the humidity content of the air to very low levels, all having the effect of causing respiratory ailments, the drying out of furniture, and static electricity conditions. Many of the devices proposed for alleviating such very low humidity have included devices such as wicking arrangements located in the hot air plenum of the furnace. Such wicking arrangements are generally located in a reservoir, and the water is supplied to the reservoir by means of a float controlled valve device. As evaporation takes place a large amount of mineral is left behind, greatly reducing the efficiency of the wicks. Moreover, since the valve controlling the level of the water within the reservoir in which the wicks are immersed generally operates at neither a fully closed nor fully open position, but rather in positions where the water trickles into the reservoir, the valve readily becomes corroded, particularly by reason of the fact that the reservoir is located in the hot air plenum.

Other forms of humidity controlling apparatus have employed a fabric covered cage turning in a reservoir, evaporation taking place from the fabric held on the cage, this material generally being in the form of a net or matrix of filamentous material. Structures of this kind are also open to the objection that as evaporation takes place the mineral content of the water is left on the mat of material greatly reducing its efficiency.

Another common form of humidifying apparatus consists of a whirling fan or disk which operates in a reservoir of water and spins off droplets of water into the furnace plenum. The reservoir in such examples in time becomes coated or filled with lime-like material.

According to the present invention, a fine mist or spray is introduced into the furnace plenum, the pressure of the water being introduced into the plenum being at such a high level that complete atomization takes place immediately, and so that the mineral content of the water is immediately deposited upon the filter screens of the furnace. In carrying out the invention there is provided a reservoir connected to a source of water under conventional main pressure, the reservoir being closed by a moving wall which operates to exert extremely high pressure upon the water within the reservoir, the reservoir being connected to an atomizing head having a valve therein which opens at a pressure greatly higher than the pressure of the incoming supply water to the reservoir. The moving wall of the reservoir is controlled by suitable motor means which is cycled in accordance with the humidity level within the heated space, and in accordance with the operation of the blower on the furnace.

With the foregoing considerations in mind it is a principal object of this invention to provide an improved humidifying apparatus characterized by the use of a simple reservoir having a motor operated moving wall effective to introduce into the plenum of the furnace a fine mist or spray under extremely high pressure.

Another object is to provide humidifying apparatus which is cycled according to the need for humidifying the heated space, that is to say, once the demand for humidity ceases, the apparatus is no longer operable, and to provide apparatus which can go through a series of operating cycles depending upon the operation of the furnace blower and the demand for additional humidity under the control of a humidistat within the space being heated.

Other objects and important features of the invention will be apparent from a study of the specification following taken with the drawings, which together describe and illustrate a preferred embodiment of the invention, and what is now considered to be the best mode of practicing the principles thereof. Other embodiments of the invention may be suggested to those having the benefit of the teachings herein, and such other embodiments are intended to be reserved especially as they fall within the scope and purview of the subjoined claims.

In the drawings:

FIG. 1 is a schematic view of a warm air heating system having the improved humidifying apparatus according to the present invention incorporated therein; and FIG. 2 is a detailed cross sectional view of the apparatus according to the present invention, certain parts thereof being shown schematically, and showing the device according to the present invention connected into control circuitry therefor.

Referring now particularly to FIG. 1 of the drawings, the improved humidifying apparatus according to the present invention is referred to by the reference numeral 10, and is shown in the environment of a warm air heating system consisting of a burner or heat exchange portion 11, a return or cold air plenum 12 and a hot air or supply plenum 13. Cold air plenum 12 may have a main duct 14 connected thereto and hot air plenum 13 may have a main hot air duct 16 connected thereto, these two main ducts being connected to branching ducts, not shown, for the supply and return of air to a heated space S.

The burner portion 11 of the warm air system shown includes a burner 17 connected to a gas supply main 18. Burner 17 is under the control of a thermostat T located in space S, thermostat T being connected by leads 19 and 21 to control a solenoid operated valve 22. As is conventional in such systems, burner 17 may have a pilot light and other safety equipment, but such equipment forms no part of the present invention, and is accordingly not described in any detail.

It should be understood that the burner portion 11 may be fueled by other fuels than gas, such as oil or coal.

Cold air or return plenum 12 contains a blower 23 having a pulley 24 connected by a drive belt 26 to a pulley 27 of a blower motor 28. When motor 28 is energized, it moves air from the cold air plenum 14 past a pair of dust filters 29 located in plenum 14 and across heat exchange surfaces, not shown, of the burner unit 11, and to the hot air plenum 13 and the hot air duct 16 leading therefrom. Motor 28 is powered from a pair of main power leads 31 and 32, and the motor 28 is under the control of a limit switch 33 connected in line 32, motor 28 being energized when the temperature in the burner unit 11 reaches a proper value.

The description thus far is merely by way of environment in which the improved humidifying apparatus 10 according to the present invention is adapted to operate.

Humidifier 10 is adapted to be operated when the motor 28 operates the blower 24, and to this end the humidifier 10 is supplied with power from a circuit comprising leads 34 and 36 connected in parallel to the power leads 31 and 32, but between motor 28 and limit switch 33. Humidifier 10 may be under the control of an humidistat H connected in the lead 36 to the humidifier 10, and when humidistat H calls for additional humidity while blower 24 is operating, humidifier 10 will operate.

Humidifier 10 is supplied with water from the conventional municipal or other supply by means of a supply pipe 37, and the humidifier 10 has an atomizer pipe 38 extending therefrom terminating in an atomizer head 39 adapted to supply a fine mist or vapor to the plenum 14 under conditions as will now be described.

Referring now particularly to FIG. 2 of the drawings, humidifier 10 includes an open end vessel 41 having a circular flange 42 at one end thereof. The open end of the vessel 42 is closed by a sock-type diaphragm 43, and the peripheral portions of the diaphragm 43 are held to the flange 42 by means of a ring 44 and plurality of cap screws 46 which are screwed into the flange 42.

Vessel 41 is connected to the atomizing head 39 by conduit 38, and a spring biased valve referred to generally by reference numeral 47 is placed in conduit 38 between vessel 41 and atomizing head 39. Valve 47 comprises a seat 48 which is closed by a tapered valve member 49 urged against seat 48 by a spring 51 bottomed at one end against the tapered valve member 49, and at the other end against an abutment member 52 within conduit 38. The valve 47 is adapted to open from the pressure in vessel 41, under conditions as will be described, and is set to open at a pressure greatly in excess of the pressure at the supply main 37 connected to the vessel 41.

Supply main 37 has a check valve 53 therein which permits flow from the main 37 but no return movement of the water to the main 37.

Structure is provided for moving the sock-type diaphragm 43 under a force which will give a resultant pressure within the vessel 41, the diaphragm 43 having at the same time a large amount of movement so as to move water from the vessel 43 which has been fed thereto by supply main 37. Under such condition, a fine mist will be delivered by the atomizing head 39 within the return air plenum 14.

The sock-type diaphragm 43 is accordingly moved by an actuating rod 54 connected at its end to spaced disks 56 and 57 holding diaphragm 43 therebetween, disks 56 and 57 being held in place to the rod 54 by a holding nut 58.

The other end of rod 54 has a rack portion 59, and the rod 54 is adapted to be driven in a direction to force water from the vessel 41 and out of the atomizing head. The rack 59 accordingly meshes with a pinion 61 of a gear reduction train comprising a shaft 62 upon which pinion 61 is mounted, and a pair of reduction gears 63 and 64, the larger reduction gear 63 being fast on shaft 62, and the smaller reduction gear 64 being fast on a shaft 66 of a motor 67.

A circuit is provided for energizing motor 67 to move the actuating rod 54 to the right to move water under pressure from the vessel 41. The motor 67 is adapted to be energized only under conditions where the blower, see FIG. 1, is in operation, and preferably only when humidistat H is calling for humidity to be supplied to space S.

Consider now a condition where the actuating rod 54 for diaphragm 43 is in a start position against an abutment 68. Under such condition, the pressure in the main 37 will cause the vessel 41 to be filled, the check valve 53 opening during such filling operation.

With the actuating rod in the left-most position, a switch actuating member 69 on actuating rod 54 closes a pair of switch contacts 71 and 72. Switch contact 72 is connected in a lead 73 to a contact 74 of a normally closed pair of contacts 74 and 76, contact 76 being connected to the lead 36 having humidistat H connected therein. It will be remembered that an assumption has been made that the humidistat H is demanding additional humidity and the switching mechanism therein, not shown, is closed. At the same time blower motor 28 is energized by reason of the closing of the limit switch 33 in heat exchange unit 11 of the furnace shown in FIG. 1.

Under the aforesaid condition of the contacts 71 and 72, these being closed, a circuit is made therethrough including a lead 77 connected to a relay winding 78, the other end of the relay winding 78 being connected to the other control lead 34. The energization of winding 78 causes a contact 79 associated therewith to close, and a circuit is made through contact 79, including the lead 36, closed contacts 74 and 76 and a lead 81 branching from the lead 73, closed contact 79 and lead 82 to the motor 67 and a lead 83 therefrom to the other supply line 34.

As the motor 67 operates, the actuating rod 54 will be moved to the right to exert pressure on diaphragm 43, and in turn supply finely atomized water at the atomizing head 39 to the return plenum 14. As the switch actuating member 69 moves with the actuating rod 54 to the right, contacts 71 and 72 open, but the circuit through relay winding 78 is maintained by holding contact 79 previously described. Motor 67 continues to operate until the switch actuating member 69 opens the contacts 74 and 76, thus de-energizing the relay winding 78.

If the blower is continuing its operation, and if the humidistat H is continuing its demand for additional humidity, the cycle just described will be continued, and the pressure in main 37 will move the diaphragm 43 and the actuating rod 54 back to the start position previously described to close the contacts 71 and 72 as before. In such return of the actuating rod 54 to the start position against abutment 68 motor 67 is back-driven through the gear train shown. If desired, a one-way clutch 65 may be disposed on shaft 66 to make unnecessary the back driving of motor 67 yet permitting of back driving of the gears 61, 63 and 64.

On the other hand, if humidistat H is satisfied, the cycle will not be repeated. Also, if limit switch 33 at the furnace unit 11 is opened and the blower motor 28 is no longer operating, the circuit described with reference to FIG. 2 will not be energized but the pressure at line 37 will return the sock-type diaphragm 43 and the actuating rod 54 to the dotted line position shown, ready to start another sequence of operations.

From the description foregoing, it is believed evident that there has been provided a new and useful improvement in devices for improving the humidity in a heated space. According to the present invention, it is necessary only to have a simple motor with a gear train multiplying the torque thereof effectively to supply sufficient thrust against the diaphragm 43, and a requisite increase in pressure within the vessel 41 to supply a good atomizing pressure to the atomizing head 39. It will be appreciated that the mechanism described can be positioned a distance away from the furnace, so that there is little possibility of mineral deposition from the humidifying water. Moreover, the device is useful equally as well at the hot air plenum, but in ordinary cases it is desirable to perform the humidifying operation at the cold air plenum so that the mineral from the spray will be deposited on the filters 29, 29.

While the invention has been described in terms of a preferred embodiment thereof, its scope is not intended to be limited by the precise embodiment herein shown nor otherwise than by the claims here appended.

I claim:

1. In a warm air space heating system including a furnace having supply and return plenums and a motor driven blower arranged to circulate air in said plenums in accordance with a demand condition including a circuit adapted to energize said motor operated blower, the improvement in said system for improving the humidity of said space comprising: a vessel connected to a water source, a connection from said vessel to means for atomizing water within one of said plenums expressed from said vessel, a moving wall for said vessel for placing pressure on the water therein and for expressing water at said atomizing means, means for moving said wall in a direction to express water from said vessel and to enable said wall to move in a direction to replenish the water in said vessel from said water source, and circuit means operable upon energization of said motor operated blower for controlling the movement of said wall.

2. The invention as defined in claim 1 wherein a check valve is interposed in the connection between said water source and said vessel to block movement of water from said vessel upon expressing movement of said wall, and adapted to open upon return movement of said wall to replenish said vessel.

3. The invention as defined in claim 2 wherein the connection from said vessel to said atomizing means has a valve therein set to open at a pressure in excess of the pressure of said water source.

4. The invention as defined in claim 1 wherein said moving wall is a diaphragm.

5. The invention as defined in claim 1 wherein the means for moving said wall comprises an actuating rod connected thereto, and said actuating rod is provided with a rack cooperating with motor driven gear means energized by said circuit means.

References Cited by the Examiner
UNITED STATES PATENTS

| | | | |
|---|---|---|---|
| 1,402,601 | 1/1922 | Handelan | 126—113 |
| 1,819,423 | 8/1931 | Knowlton et al. | 126—113 |
| 2,165,839 | 7/1939 | Davis. | |
| 2,279,546 | 4/1942 | Ziegler. | |
| 2,860,228 | 11/1958 | Boyle et al. | 126—113 X |

FREDERICK L. MATTESON, JR., *Primary Examiner.*

CHARLES J. MYHRE, *Examiner.*